(12) United States Patent
Golueke et al.

(10) Patent No.: US 8,579,190 B2
(45) Date of Patent: Nov. 12, 2013

(54) DEVICE FOR READING MAGNETIC STRIPE AND/OR CHIP CARDS WITH A TOUCH SCREEN FOR PIN ENTRY

(75) Inventors: Peter Golueke, Paderborn (DE); Andrea Carozzi, Delbrueck (DE)

(73) Assignee: Wincor Nixdorf International GmbH (DE)

( * ) Notice: Subject to any disclaimer, the term of this patent is extended or adjusted under 35 U.S.C. 154(b) by 0 days.

(21) Appl. No.: 13/305,166

(22) Filed: Nov. 28, 2011

(65) Prior Publication Data

US 2012/0132705 A1 May 31, 2012

(30) Foreign Application Priority Data

Nov. 29, 2010 (DE) .......................... 10 2010 060 862

(51) Int. Cl.
*G06Q 40/00* (2012.01)
*G07D 11/00* (2006.01)
(52) U.S. Cl.
USPC ........... 235/379; 235/380; 235/381; 235/382; 235/383
(58) Field of Classification Search
USPC ................................. 235/379–383, 451, 492
See application file for complete search history.

(56) References Cited

U.S. PATENT DOCUMENTS

| | | | |
|---|---|---|---|
| 5,768,386 A * | 6/1998 | Yokomoto et al. | 713/183 |
| 5,970,146 A | 10/1999 | McCall et al. | |
| 6,317,835 B1 * | 11/2001 | Bilger et al. | 713/194 |
| 6,543,684 B1 * | 4/2003 | White et al. | 235/379 |
| 6,630,928 B1 * | 10/2003 | McIntyre et al. | 345/173 |
| 6,669,100 B1 * | 12/2003 | Rogers et al. | 235/492 |
| 6,676,016 B1 * | 1/2004 | Coskrey, IV | 235/380 |
| 7,438,222 B2 * | 10/2008 | Green et al. | 235/379 |
| 7,980,464 B1 * | 7/2011 | Sarris et al. | 235/379 |
| 2002/0139984 A1 * | 10/2002 | Sugawara et al. | 257/79 |
| 2004/0179692 A1 | 9/2004 | Cheng | |
| 2006/0242421 A1 * | 10/2006 | Hsu | 713/182 |
| 2008/0158172 A1 * | 7/2008 | Hotelling et al. | 345/173 |
| 2008/0232600 A1 * | 9/2008 | Fernando et al. | 380/287 |
| 2010/0031045 A1 * | 2/2010 | Gade et al. | 713/172 |
| 2010/0195004 A1 * | 8/2010 | Hotelling | 348/792 |

FOREIGN PATENT DOCUMENTS

| | | |
|---|---|---|
| CN | 101813992 | 8/2010 |
| DE | 19807066 | 9/1999 |
| DE | 102004031677 | 1/2006 |
| DE | 102008014324 | 9/2009 |
| DE | 102008021046 | 10/2009 |
| EP | 0145405 | 10/1996 |

* cited by examiner

*Primary Examiner* — Tuyen K Vo
(74) *Attorney, Agent, or Firm* — Harness, Dickey & Pierce, P.L.C.

(57) ABSTRACT

The invention relates to a device (10) for reading magnetic stripe and/or chip cards, in particular bank cards, EC cards and/or credit cards. The device (10) comprises a display unit (14) and a touch module (16) arranged in front of this display unit for determining a position of a touch of a display area. Further, the device (10) has a security module (18) for controlling the display unit (14) and the touch module (16). The security module (18) transmits first data for displaying a keypad for entry of a PIN to the display unit (14). In response to a touch of the display area, the touch module (16) generates second data with information about the position of the touch, encrypts these data and transmits the encrypted data to the security module (18).

20 Claims, 5 Drawing Sheets

DEVICE FOR READING MAGNETIC STRIPE AND/OR CHIP CARDS WITH A TOUCH SCREEN FOR PIN ENTRY

CROSS REFERENCE TO RELATED APPLICATIONS

This application claims the benefit and priority of German Patent Application No. 102010060862.9 filed Nov. 29, 2010. The entire disclosure of the above application is incorporated herein by reference.

FIELD OF THE INVENTION

The invention relates to a device for reading magnetic stripe and/or chip cards, in particular for reading bank cards, EC cards (electronic cash cards) and/or credit credits. The device comprises a display unit and a touch module arranged in front of the display unit and comprising at least one sensor for determining a position of a touch of a display area. Further, the device comprises a security module for controlling the display unit and the touch module.

BACKGROUND OF THE INVENTION

The device is in particular an automated teller machine, an automatic cash system, an automatic cash safe and/or a payment terminal which is used, for example, in retail businesses or in restaurants for cashless payment of the billed amount via a magnetic stripe and/or chip card, in particular an EC or credit card. In known devices, a user inserts a magnetic stripe card and/or chip card into a slot provided for this purpose. By means of a reading unit, data via which the user is authenticated are read out from the magnetic stripe and/or chip card. The devices comprise a display unit via which the user is requested to enter a personal identification number, a so-called PIN, wherein the entry of the PIN shall guarantee that the user is indeed authorized to withdraw cash and/or to pay by means of the inserted magnetic stripe and/or chip card. The user then enters the PIN via a keypad provided for this purpose, in particular via a so-called Encrypted Pin Pad (EPP).

What is problematic with this entry of the PIN via the keypad is that an EPP keypad, the purchasing price of which is relatively high, has to be specially provided for this purpose to guarantee that the entered PIN cannot be intercepted. Further, for the EPP keypad installation space has to be provided which is already very limited in the afore-mentioned devices. In addition, such EPP keypads are susceptible to skimming attempts since additional keypads via which the PIN is spied out can easily be mounted thereon.

From the document DE 10 2008 014 324 A1, a self-service terminal is known which comprises an operating unit and a cover with recesses enclosing the operating unit.

From the document DE 10 2008 021 046 A1, a method for commencing operation of a keypad of a self-service terminal is known.

From the document U.S. Pat. No. 6,317,835 B1, a system for selectively generating encrypted and non-encrypted data is known.

It is the object of the invention to specify a device for reading magnetic stripe and/or chip cards, which enables a secure entry of a personal identification number.

By encrypting the second data which comprise information about the position of the touch of the display area by means of the touch module and by transmitting these data to the security module in an encrypted manner, it is achieved that the position of the touch is encrypted directly by the touch module so that the information about the position of the touch is not transmitted in a non-encrypted manner. Thus an interception of the non-encrypted information and thus conclusions on the digit of the personal identification number identified by the position of the touch or on the complete personal identification number are prevented. In this way, a secure entry of the PIN is made possible. By transmitting the first data with information for displaying a keypad by means of the display unit from the security module to the display unit, it is guaranteed that the information displayed by means of the display unit cannot be manipulated and the keypad for entering the PIN is only displayed when this is actually required for the transaction.

The touch module preferably comprises a processing unit, in particular a processor, which encrypts the second data. The touch module preferably has a separate crypto-processor by means of which the data are encrypted. By crypto-processor is in particular understood a chip or microprocessor which combines in itself the basic functions for the secure data communication such as cryptography, authentication and administration of crypto keys.

The device is in particular a device for handling notes of value, for example an automated teller machine, an automatic cash safe and/or and automatic cash system. Further, the device can also be a payment terminal, for example a terminal for cashless payment in retail stores and/or in the catering trade. In addition, the device can also be a statement printer and/or an information terminal in a bank branch.

The device comprises in particular a reading device into which the magnetic stripe or chip card is inserted and which reads out data from the magnetic stripe or chip card. After reading out the data, the user of the device is requested in particular via the display unit to enter the PIN to thus ensure that the user is authorized to use the magnetic stripe and/or chip card.

The display area on which the position of the touch is detected can be formed by a pane of the display unit and/or a separate pane of the touch module. Further, the display unit and the touch module can be integrally formed in the form of a touchscreen. The determination of the position of the touch via the sensor takes place in particular optically, resistively, capacitively and/or inductively.

The touch module can in particular be a resistive touch module, in which the sensor comprises two conductive layers arranged in front of the display unit, wherein a voltage being applied to at least one of these layers and the voltages being determined at the edges of the at least one layer. Dependent on these determined voltages, the position of the touch is detected in particular by means of the processing unit of the touch module. One of the two layers can in particular be formed by the pane.

Alternatively, the touch module can also be a capacitive touch module which comprises a pane that is coated with a transparent metal-oxide layer. At the edges of the coating, an electric voltage is applied which generates a uniform electric field. By touching the pane, small currents are generated which are measured at the edges. The resulting currents are directly related to the position where the pane of the touch module is touched by the user. The pane may also be a pane of the display unit.

In a further alternative embodiment, also a touch module can be provided that determines the position of the touch by means of infrared light. In this case, the touch module comprises diodes that emit infrared light and generate a grid of infrared beams across the pane. Opposite to the diodes that emit infrared light, diodes that detect infrared light are provided which receive the emitted infrared beams if these are not interrupted. When the pane is touched, at least a part of the emitted infrared beams is interrupted so that some of the detecting diodes detect no or substantially less infrared radiation. Dependent thereon, the position of the touch is determined in particular by means of the processing unit.

The first data and/or the second data can also be transmitted in the form of signals. By arranging the touch module in front of the display unit it is in particular understood that the touch module is arranged in front of a display area of the display unit. The detection area of the touch module for detecting the touch is preferably arranged between the display unit and the user.

In a preferred embodiment of the invention, the security module encrypts the first data and transmits these encrypted data to the display unit. This ensures that a manipulation of the first data and thus the manipulation of the information displayed by means of the display unit are prevented or at least made more difficult. In particular, this prevents that a keypad with the request for PIN entry is displayed on the display unit with intent to defraud.

The touch module in particular determines a first and/or a second coordinate of the position of the touch of the display area and determines a first transmission value by adding a first offset value to the first coordinate and/or a second transmission value by adding a second offset value to the second coordinate. The second data comprise information about the first transmission value and/or the second transmission value. By adding the offset values it is achieved that not the actual coordinate but a modified numerical value is transmitted. This ensures that no conclusions can be drawn from the transmission values on the position of the touch of the display area. In particular, only by means of the transmission values, without the offset values, no conclusions can be drawn on the digit or, respectively, the PIN entered via the touch module.

The security module preferably determines the first offset value and/or the second offset value, in particular by means of a random number generator. This ensures that the coordinates of different touches of the display area, in particular even every coordinate of different touches of the display area, are falsified with a different offset value so that a higher degree of security is obtained. The security module transmits third data with information about the first offset value and/or the second offset value to the touch module before the display area is touched. The transmission in particular takes place in an encrypted manner so that the offset values cannot be intercepted. The encrypted offset values are in particular decrypted by the processing unit of the touch module. Thus, the degree of security is increased even further. In particular each digit of a PIN is encrypted with different offset values.

The encryption of the first, the second and/or the third data preferably takes place by means of a stored encryption algorithm, in particular by means of a Data Encryption Standard (DES) encryption algorithm. Thus, the data transmission security is increased further. In a particularly preferred embodiment of the invention, the encryption of the data takes place both by the addition of the offset values and by the execution of the stored encryption algorithm so that a double encryption of the transmitted data is given. Thus, a very high degree of data security is obtained.

The encryption of the first, the second and/or the third data preferably takes place by means of the same encryption algorithm. In an alternative embodiment of the invention, the security module can encrypt the first and/or the third data also with an encryption algorithm different from the encryption algorithm with which the touch module encrypts the second data.

The security module preferably decrypts the second data received by the touch module and determines the first coordinate by subtracting the first offset value from the first transmission value and/or the second coordinate by subtracting the second offset value from the second transmission value. Thus, it is achieved that in the security module the position of the touch of the display area and consequently the entered digit can be determined via the coordinates.

The first data transmitted from the security module to the touch module in particular comprise information about the position where the keypad is to be displayed on the display unit. The first data comprise in particular a first coordinate and a second coordinate of a preset point of the keypad, in particular of the center of the keypad. The position where the keypad is displayed on the display unit is determined by the security module in particular by means of a random process. For this, the first coordinate and the second coordinate are preferably determined by means of a random number generator. This ensures that the keypad is displayed at different positions of the display unit in the case of different entries of PIN numbers. By this change in the position of the keypad on the display unit it is made impossible for people who try to spy out the PIN with intent to defraud to draw a conclusion on the digit of the PIN entered by the touch on the basis of the position where the display area is touched. In particular, it is thus prevented that a further unit for determining the position of the touch of the display area is attached with intent to defraud to the display area, via which further unit the people who commit the fraud try to obtain the PIN.

For this, the security module controls the display unit such that the display unit displays the keypad at a first position in the case of a first PIN entry and displays it at a second position different from the first position in the case of a second PIN entry.

The touch module and the security module are preferably connected to each other via a first cable connection, in particular by means of a USB cable. The display unit and the security module are preferably connected to each other via a second cable connection, in particular by means of a USB cable and/or a DVI cable. By connecting the security module to the touch module or, respectively, to the display unit via a wired connection, a higher degree of security is obtained compared to a wireless data transmission. Further, it is advantageous when a first sensor for determining an interruption of the first cable connection and/or a second sensor for determining an interruption of the second cable connection are provided. Thus, manipulation attempts, in particular the interposition of a unit for reading out the data transmitted via the respective cable connection can be detected and thus manipulation attempts can be prevented. When the first sensor and/or the second sensor detects an interruption of the first or, respectively, the second cable connection, preferably an alarm is set off so that a user's attention is drawn to the manipulation attempt. Further, when an interruption of the first and/or the second cable connection is detected, a red display element, for example an LED can be illuminated or a display area provided for this and/or a display element provided for this can be activated so that the user's attention is drawn to the manipulation. Alternatively, it is possible that in the case of an interruption of the first and/or the second cable connection the device is switched into a malfunction mode in which a PIN entry is not possible.

It is advantageous when the touch module comprises a memory element in which data for the unambiguous identification of the touch module, in particular a serial number, are stored. These data will be read out by the security module at preset intervals or continuously, and the security module will determine the presence of the touch module dependent on these read-out data. In a particularly preferred embodiment of the invention, the security module compares the read-out serial number with a preset desired serial number. When the read-out serial number and the desired serial number are not identical and/or when the security module cannot determine any serial number at all, the non-presence of the display unit is thus detected.

Further, it is advantageous when also the display unit comprises a memory element in which data for the unambiguous identification of the display unit are stored. These data are likewise read-out by the security module at preset intervals or continuously, and the security module determines the presence of the display unit dependent on the read-out data. In the memory element of the display unit a serial number is in particular stored which is compared to a preset desired serial number by the security module.

The memory element of the touch module and/or the memory element of the display unit are preferably connected via a respective Inter Integrated Circuit (I2C) bus to the security module. As a result thereof, an easy, tamper-proof connection is established.

Further, it is advantageous when the touch module and/or the display unit are mounted on a housing of the device in an installation position and when a first anti-removal switch and/or a second anti-removal switch are provided. By means of the first anti-removal switch the removal of the touch module from the installation position can be determined, and by means of the second anti-removal switch the removal of the display unit from the installation position can be determined. For this, the first anti-removal switch opens a closed electric circuit or closes an open electric circuit when the touch module is removed from its installation position. By opening or, respectively, closing the electric circuit, the security module detects the removal of the touch module from the installation position. Accordingly, the second anti-removal switch opens the same or another closed electric circuit or, respectively, closes the same or another open circuit when the display unit is removed from the installation position. The security module detects the removal of the display unit from the installation position dependent on the opening or, respectively, closing of the electric circuit. Thus, by means of the anti-removal switches it can easily be determined when the touch module and/or the display unit are removed from the installation position so that manipulation attempts can be determined easily and promptly. In an alternative embodiment, also only one anti-removal switch can be provided, by means of which both the removal of the touch module from the installation position and the removal of the display unit from the installation position are detectable.

Further, it is advantageous when the security module determines whether the device is operated in a secure operating mode or in a non-secure operating mode. The device is in particular operated in the secure operating mode when data are transmitted between the security module and the touch module in an encrypted manner, the data are transmitted between the security module and the display unit in an encrypted manner, the first cable connection is not interrupted, the second cable connection is not interrupted, the display unit is arranged in the installation position and/or the touch module is arranged in the installation position.

The secure operating mode is in particular the mode which is provided for the entry of the PIN. In a particularly preferred embodiment of the invention, the PIN entry is only possible when the device is actually operated in the secure operating mode.

The security module controls the display unit in particular such that it is displayed via the display unit in which operating state the device is operated. This ensures that a user of the device can identify the operating mode and, if the non-secure operating mode is displayed, the user can refrain from entering the PIN. Thus, protection against spying out of the PIN is increased. The display unit in particular shows a red and a green area, wherein, when the device is operated in the secure operating mode, the green area is displayed in bright green and the red area is displayed in dark red, whereas the green area is displayed in dark green and the red area is displayed in bright red when the device is operated in the non-secure operating mode. In an alternative embodiment of the invention, also lamps arranged outside the display unit, in particular LEDs, can be provided via which the operating mode is displayed. Additionally or alternatively, the operating mode can also be identified via a warning sound, in particular a warning sound can be activated in the non-secure operating mode.

Further, it is advantageous when the security module controls the display unit such that it displays information by which a user of the device is requested to only enter the PIN in the secure operating mode. This prevents that the user inadvertently ignores the operating mode in which the device is operated, and thus it is prevented that the user inadvertently enters the PIN in the non-secure operating mode.

Further, it is advantageous when a privacy protection film is applied to at least a partial area of the display unit, by which film the information displayed by means of the display unit can only be read from a preset viewing distance range and/or a preset viewing angle range. The viewing distance range and the viewing angle range are in particular preset such that only a user directly in front of the display unit can read the displayed information. This makes it more difficult to spy out the PIN, as the spying person can indeed see which position of the display area is touched by the user entering the PIN, but cannot see which digit is displayed at this position of the display unit. The privacy protection film in particular forms a polarization filter.

Further, it is advantageous when at least on one side of the display unit at least one mechanical privacy protection element is arranged for preventing that the entry of the PIN is spied out. In particular, such a mechanical privacy protection element is provided at at least three sides of the display unit. The privacy protection element prevents or makes it more difficult that a spying person can see at which position the user touches the display unit.

The device can in particular comprise a control unit for controlling the security module, the control unit being connected to the security module via at least one data transmission connection, preferably a wired data transmission connection. The control unit further serves to control further units of the device, for example to control a reading unit for reading out the magnetic stripe and/or chip card. By interposing the security module between the control unit and the touch module, it is achieved that the control unit has no direct access to the display unit and the touch module so that even if a person succeeds in obtaining access to the control unit, this does not allow any access to the entered PIN, and the display unit and the touch module can likewise not be manipulated such that the PIN can be determined. Thus, the security is increased.

In the non-secure operating mode, the security module forwards data generated by the control unit for controlling the display unit to the display unit in an unchanged form so that in the case of non-security relevant entries the computing expenditure of the security module is minimized. On the other hand, in the secure operating mode the security module exclusively forwards self-generated data to the display unit. This ensures that in the secure operating mode possible manipulations of the control unit have no influence on the display of the display unit. The security module comprises in particular a DVI switch via which in the non-secure operating mode the data transmission connection from the control unit to the security module is directly connected to a data transmission connection from the security module to the display unit, in particular to the second cable connection. In the secure operating mode, the afore-described data transmission connection between the control unit and the display unit is interrupted by the DVI switch.

The control unit executes in particular program data of a first operating system and the security module executes program data of a second operating system different from the first operating system. The operating systems are in particular designed such that they are independent of each other. Thus, the degree of security is increased further. The first operating system is in particular a commercial operating system, whereas the second operating system is an operating system that is specially programmed for the tasks of the security module. This ensures that security vulnerabilities of the commercial operating system have at least in the secure operating mode no effects on the security of the PIN entry.

Further features and advantages of the invention result from the following description which, in connection with the enclosed Figures, explains the invention in more detail with reference to embodiments.

DETAILED DESCRIPTION OF THE PREFERRED EMBODIMENTS

Figure 1:
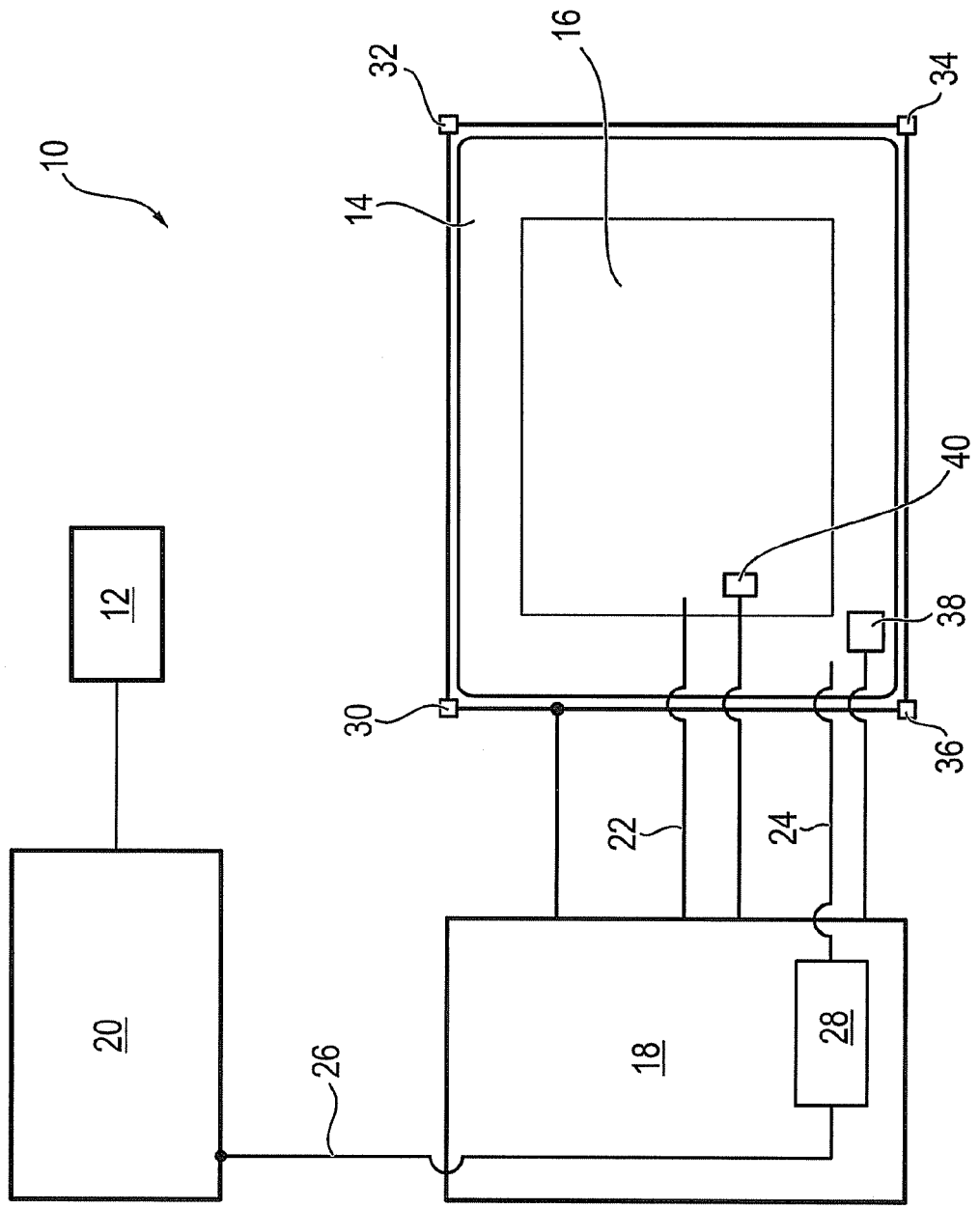
FIG. 1 shows a block diagram of a device for reading out magnetic stripe and/or chip cards.

In FIG. 1 a schematic, highly simplified illustration of a device 10 for reading magnetic stripe and/or chip cards is illustrated in the form of a block diagram. The device 10 comprises a reading unit 12 for reading the magnetic stripe and/or chip card, a display unit 14, a touch module 16 arranged in front of the display unit 14, a security module 18 for controlling the display unit 14 and the touch module 16, and a control unit 20 for controlling the reading unit 12 and the security module 18.

The device 10 is in particular an automated teller machine, an automatic cash safe, an automatic cash system, a payment terminal, a statement printer or an information terminal. The magnetic stripe and/or chip card is in particular a bank card, an EC card and/or a credit card. By arranging the touch module 16 in front of the display unit 14, it is in particular understood that the touch module 16 is arranged in front of the side of the display unit by means of which the information can be displayed. The touch module 16 is in particular arranged between a user 10 operating the device 10 and the display unit 14. The display unit 14 is in particular a display. In this case, the touch module 16 is arranged in front of the display.

The touch module 16 comprises at least one non-illustrated sensor for detecting the position of the touch of a display area. The display area can in particular be a pane of the display unit 14 or a separate pane of the touch module 16 provided for protection of the display unit 14. The display unit 14 and the touch module 16 can preferably be formed in one piece in the form of a touchscreen.

Via a first cable connection 22, in particular via a USB cable, the security module 18 is connected to the touch module 16 for data transmission. Further, via a second cable connection 24, in particular a USB cable and/or DVI cable, the security module 18 is connected to the display unit 14. In addition, the security module 18 is connected to the control unit 20 via a data transmission connection 26. The data transmission connection 26 is established in particular via a USB cable or a DVI cable. In an alternative embodiment of the invention, the control unit 20 can also be connected to the security module 18 via two data transmission connections, in particular via a USB cable and a DVI cable.

The security module 18 comprises a DVI switch 28 via which—in a non-secure operating mode—data that were transmitted from the control unit 20 to the security module 18 via the data transmission connection 26 are forwarded to the display unit 14 via the second cable connection 24 in an unchanged form. In a secure operating mode, on the other hand, the DVI switch interrupts the direct connection between the control unit 20 and the display unit 14 so that via the second cable connection 24 only data generated by the security module 18 can be transmitted to the display unit 14.

The control unit 20 is in particular operated with a first operating system and the security module 18 is operated with a second operating system different from the first operating system. The first operating system is in particular a commercial operating system, for example Microsoft Windows, whereas the second operating system of the security module 18 is an operating system that is specifically programmed for the security module 18. Thus, the second operating system is exactly tailored to the tasks of the security module 18. By interrupting the direct data connection between the control unit 20 and the display unit 14 in the secure operating mode, it is achieved that possible existing security vulnerabilities of the commercial first operating system of the control unit 20 cannot be used for manipulation of the display of the display unit 14 at least in the secure operating mode. A high degree of security is achieved in this way.

In their installation position, the display unit 14 and the touch module 16 are connected to at least one non-illustrated housing part of the device 10. The device 10 comprises four anti-removal switches 30 to 36 which are also referred to as removal switch. When the display unit 14 and/or the touch module 16 is removed from the installation position, then one of the anti-removal switches 30 to 36 or several of the anti-removal switches 30 to 36 open a previously closed electric circuit. By opening the closed electric circuit the security module 18 detects the removal of the display unit 14 and/or of the touch module 16 from the installation position.

In an alternative embodiment of the invention, also a previously open electric circuit can be closed by one or more of the anti-removal switches 30 to 36 when the display unit 14 and/or the touch module 16 is removed from the installation position, and the security module 18 can detect the removal of the display unit 14 and/or of the touch module 16 from the installation position dependent on the opening of the electric circuit. This ensures that manipulations to the display unit 14 and/or to the touch module 16 can easily be detected and the security is thus increased.

Further, the display unit 14 comprises a memory element 38 in which data for the unambiguous identification of the display unit 14 are stored. These data comprise in particular a unique serial number. The security module 18 reads out the data stored in the memory element 38 at preset intervals or continuously and determines dependent on the read-out data whether the display unit 14 is present or not. This takes place in particular by means of a comparison of the serial number read out from the memory element 38 with a preset desired serial number stored in a memory element of the security module 18, or one analyses and checks the validity of the read-out serial number in another way. When the two numbers are different from one another or when the security module 18 cannot read out any serial number from the memory element 38, then it is concluded therefrom that the display unit 14 has been removed from the installation position, the second cable connection 24 has been separated, the display unit 14 has been manipulated and/or the second cable connection 24 has been manipulated.

Likewise, the touch module 16 comprises a memory element 40 in which data for the unambiguous identification of the touch module 16 are stored. The security module 18 reads out the data from the memory element 40 at preset intervals or continuously and determines dependent on the read-out data the presence of the touch module 16. The data stored in the memory element 40 in particular comprise a serial number of the touch module 16. The security module 18 compares this serial number to a preset desired serial number stored in a memory element of the security module 18. If it results from this comparison that the serial number and the desired serial number are not identical, or if the security module 18 could not read out any serial number at all, then it is concluded therefrom that the touch module 16 has been removed from the installation position, the touch module 16 has been manipulated, the first cable connection 22 has been interrupted and/or the first cable connection 22 has been manipulated.

Each of the memory elements 38, 40 preferably comprises one serial number chip of the company Maxim Integrated Products Inc. of the type "DS2401". The memory elements 38, 40 are preferably respectively connected to the security module via an Integrated Circuit (I2C) bus. By the removal of the touch module 16 or, respectively, of the display unit 14 from the installation position it is in particular understood when the touch module 16, or, respectively, the display unit 14 is demounted or its position and/or orientation within the device 10 is changed. Alternatively or additionally, a removal of the display unit 14 and/or of the touch module 16 from the installation position can also be determined by means of acceleration sensors.

When a user of the device 10 inserts a magnetic stripe and/or chip card into the reading unit 12, then the security module 18 generates first data for displaying a keypad for entry of a personal identification number (PIN) of the user on the display unit 14. The security module 18 encrypts the first data by means of a preset encryption algorithm, in particular by means of a data encryption standard (DES) encryption algorithm, and transmits the encrypted first data via the second cable connection 24 to the display unit 14. Then a keypad via which the user of the device 10 can enter a PIN is displayed on the display unit 14.

Figure 2:
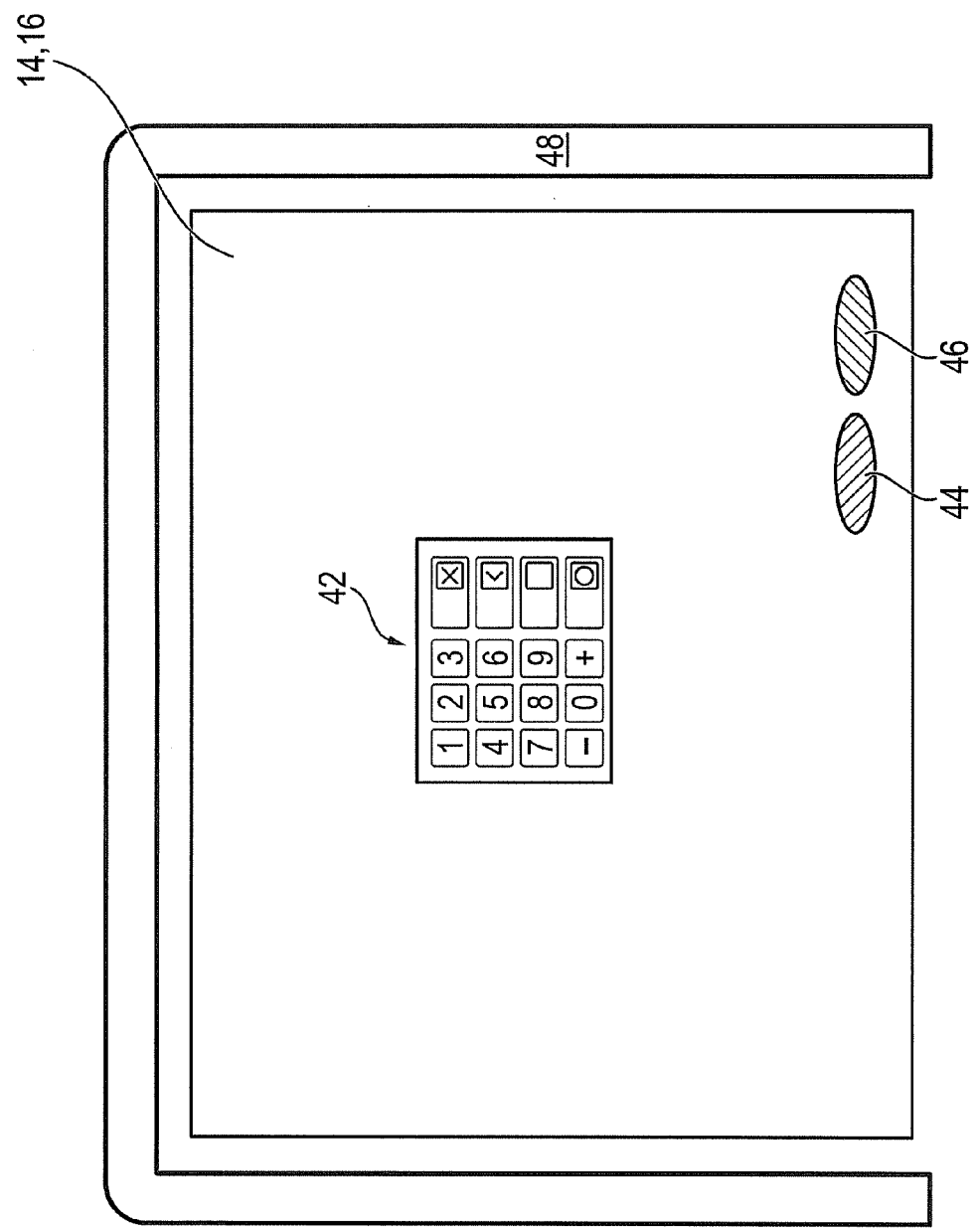
FIG. 2 is a schematic illustration of a detail of the device of FIG. 1 according to a first embodiment of the invention.

In FIG. 2, a schematic illustration of a detail of the device 10 of FIG. 1 according to a first embodiment of the invention is illustrated. In this first embodiment, the keypad for PIN entry is displayed in the center of the display unit 14. In the first embodiment shown in FIG. 2, the touch module 16 is designed such that the entire screen of the display unit 14 is covered by the touch module 16 so that the position of a touch can be determined over the entire screen. In the schematic top view shown in FIG. 2, thus the display unit 14 and the touch module 16 coincide so that they are identified by the same reference sign 14, 16. The keypad displayed on the display unit 14 is identified with the reference sign 42.

For entry of the PIN, the user touches the pane at the position where the digit of the PIN to be entered is displayed. The position of the touch of the pane is determined by means of a sensor of the touch module 16. In particular, the sensor determines a first and a second coordinate of the position of the touch of the pane. From this, a processing unit of the touch module 16 determines a first and a second transmission value in that it adds a first offset value to the first coordinate and a second offset value to the second coordinate. The two offset values were previously transmitted in an encrypted manner from the security module 18 to the touch module 16 and decrypted by the processing unit. Thereafter, the processing unit of the touch module 16 generates second data with information about the first and the second transmission value, encrypts these second data with a preset encryption algorithm, in particular by means of a Data Encryption Standard (DES) encryption algorithm, and transmits the encrypted second data via the first cable connection 22 to the security module 18. The encryption algorithm with which the processing unit encrypts the second data is in particular the same encryption algorithm with which the security module 18 encrypts the first data.

By transmitting the transmission values and not the actual coordinates of the touch it is achieved that, if third parties were to determine and decrypt the transmission values, on the basis of this gained information no conclusions could be drawn on the position of the touch of the pane and thus on the digit of the PIN entered via the position. Thus, a secure entry of the PIN is made possible.

In particular, every time the pane is touched the coordinates of this touch are falsified by different offset values so that by the one-time comparison of the transmission values with the actual coordinates no conclusions can be drawn to the offset values in the case of other touches. The offset values are in particular determined by the security module 18 using a random process. In particular, a random number generator is used for this purpose.

The security module 18 decrypts the encrypted second data and determines by way of subtraction of the first offset value from the first transmission value and by way of subtraction of the second offset value from the second transmission value the first and the second coordinate of the position of the touch of the pane. By comparison of the position of the touch of the pane with the position where the keypad 42 is displayed, the security module 18 determines the digit of the PIN entered by the touch. In an alternative embodiment of the invention, it is likewise possible that not every single digit of the PIN is individually transmitted from the touch module 16 to the security module 18, but data with information on the coordinates of several touches which altogether result in the PIN are transmitted.

By encrypting the second data by means of the touch module 16 it is ensured that these data are never transmitted in a non-encrypted manner so that even if those data were intercepted, it is not possible to draw any conclusions on the entered PIN therefrom. Thus, a high degree of security is achieved.

As described above, the security module 18 can be operated in a non-secure and a secure operating mode. In particular, two display elements, preferably in the form of virtual lamps 44, 46, are displayed on the display unit 14, by means of which the operating mode in which the device 10 is actually operated is displayed. For this, in particular in the secure operating mode the first virtual lamp 44 is displayed in a bright green tone and a second virtual lamp 46 is displayed in a dark red tone, and in the non-secure operating mode the first virtual lamp 44 is displayed in a dark green tone and the second virtual lamp 46 is displayed in a bright red tone. Thus, the illumination of a green or, respectively, a red lamp is indicated so that the user knows that the device 10 is operated in the secure operating mode when the green lamp is illuminated and that the device 10 is operated in the non-secure operating mode when the red lamp is illuminated. Thus, the user can make sure that he/she only enters his/her PIN in the secure operating mode so that the secrecy of his/her PIN is guaranteed. In a particularly preferred embodiment of the invention, the user will be requested via a corresponding display of the display unit 14 to only enter his/her PIN when the device is operated in the secure operating mode.

Additionally or alternatively, the security module 18 can control the display unit 14 and/or the touch module 16 such that a PIN can only be entered when the device 10 is operated in the secure operating mode. For this, the security module 18 controls the display unit 14 in particular such that the display unit 14 only displays a keypad when the device 10 is operated in the secure operating mode.

In an alternative embodiment of the invention, the operating mode can also be displayed by lamps, in particular LEDs, provided outside the display unit 14, as an alternative to the virtual lamps 44, 46. Further, the display of the operating mode in text form on the display unit 14 and/or the emission of a warning sound when the device 10 is operated in the non-secure operating mode is possible.

When the non-presence of the display unit 14, the non-presence of the touch module 16, a manipulation of the display unit 14, a manipulation of the touch module 16, an interruption of the first cable connection 22, an interruption of the second cable connection 24 and/or another manipulation attempt is determined by means of the anti-removal switches 30 to 36 and/or the memory elements 38, 40, the security module 18 controls the display unit 14 such that it is displayed on the display unit that the device 10 is operated in the non-secure operating mode. In particular, in this case too, the entry of a PIN is not possible.

Further, the device 10 comprises a privacy protection element 48 which prevents that the entry of the PIN is spied out. The privacy protection element 48 is in particular designed such that at least three sides of the display unit 14 are surrounded by the privacy protection element 48 so that a further person standing next to the user cannot view the display unit 14. This prevents that the further person can see the position where the user touches the pane.

Figure 3:
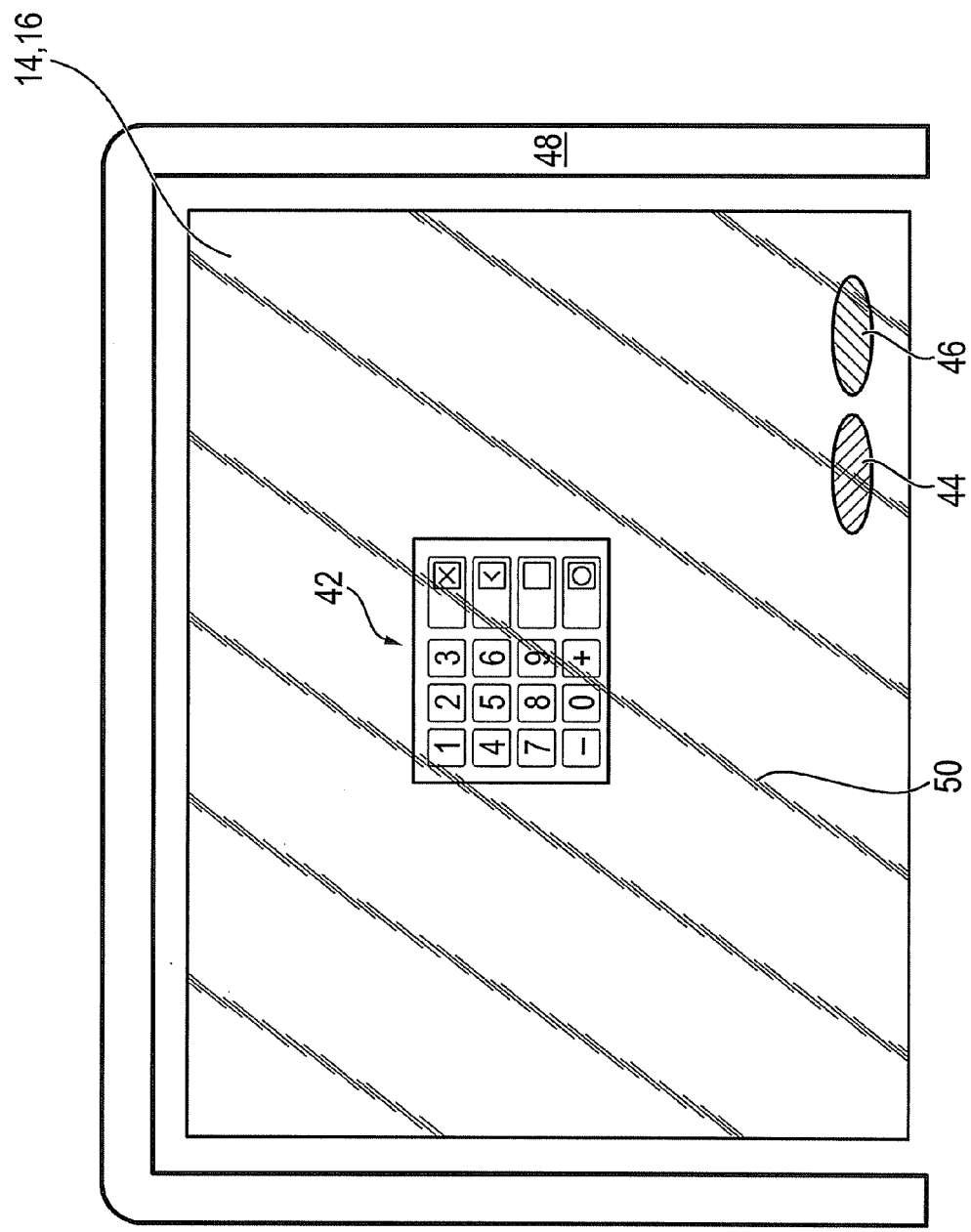
FIG. 3 is a schematic illustration of a detail of the device of FIG. 1 according to a second embodiment of the invention.

In FIG. 3, a schematic illustration of a detail of the device 10 according to a second embodiment of the invention is shown. In this second embodiment of the invention, a privacy protection film 50 is applied to the pane, by which spying out of the PIN is likewise to be prevented. The privacy protection film 50 is designed such that only the user standing directly in front of the device 10 can read the display of the display unit 14. A person standing further away or next to the user, on the other hand, cannot read the display of the display unit 14. This ensures that even if the further person can see the position where the user touches the pane, the further person cannot see which key is displayed at this position. Thus, the further person cannot spy out the PIN of the user.

Figure 4:
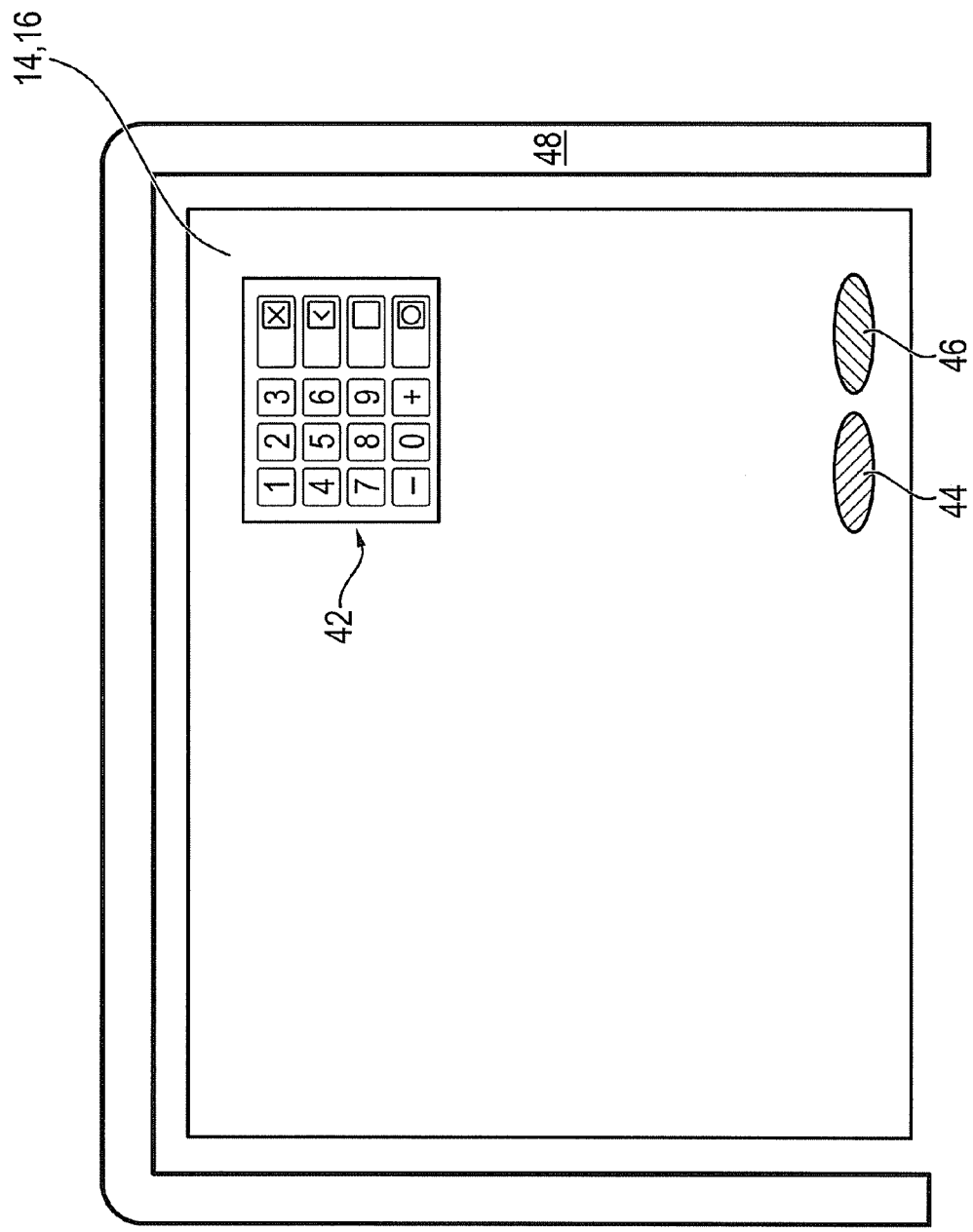
FIG. 4 is a schematic illustration of a detail of the device of FIG. 1 according to a third embodiment of the invention.

In FIG. 4, a schematic illustration of a detail of the device 10 according to a third embodiment of the invention is shown. In this third embodiment of the invention, the security module 18 transmits third data with information about the position where the keypad 42 is to be displayed on the display unit 14 before the PIN is entered by the user. In particular, these third data comprise a first and a second coordinate of a preset point of the keypad 42, in particular of the center of the keypad 42.

Additionally or alternatively, also the size of the displayed keypad, the size of one or more keys of the displayed keypad and/or the distances between the keys can be varied.

Figure 5:
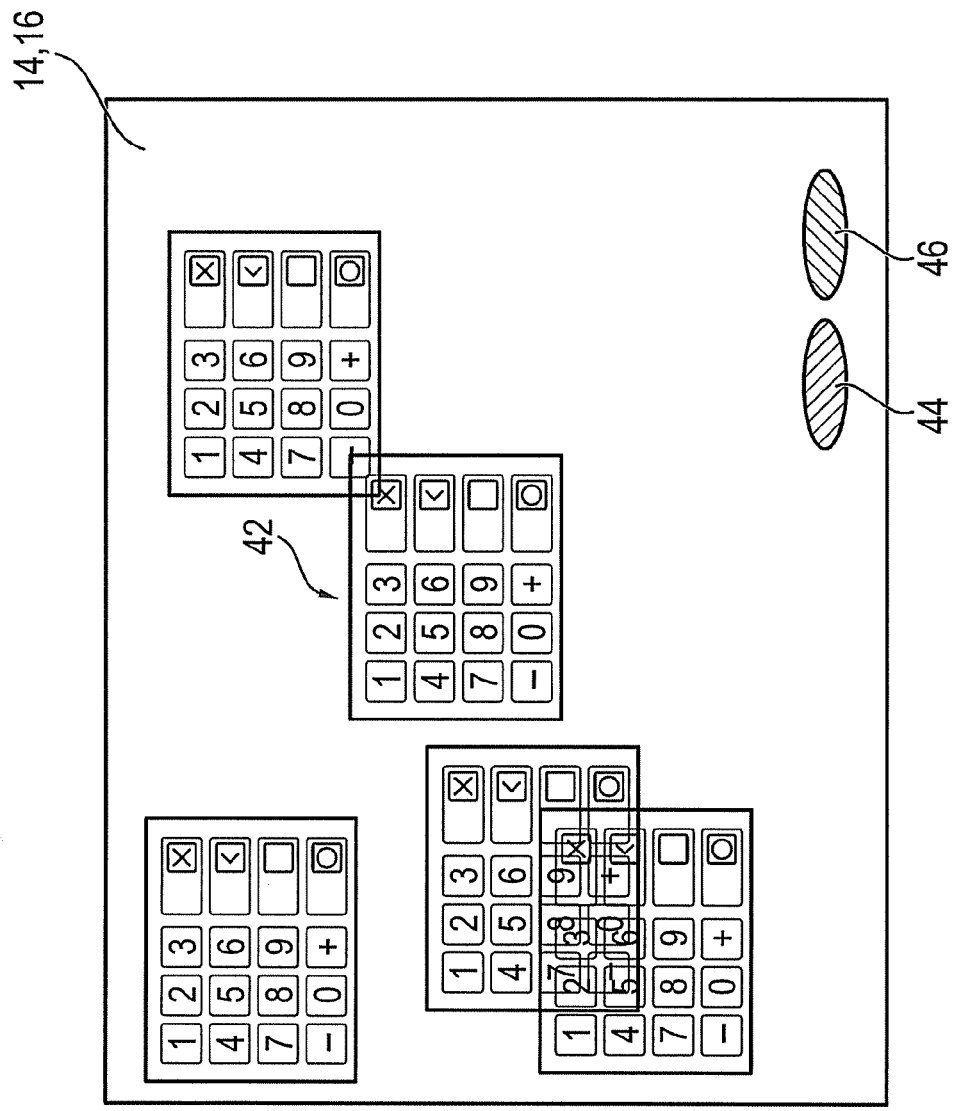
FIG. 5 is a superimposed illustration of several displays of a display unit of the device of FIG. 1 according to the third embodiment.

The security module 18 determines the position where the keypad 42 is to be displayed, in particular by means of a random process, so that in the case of different PIN entries the keypad is displayed at different positions of the display unit 42. The display of the keypad 42 at different positions of the display unit 14 is illustrated in FIG. 5. The security module 18 in particular comprises a random number generator that determines the coordinates and/or the size of the keypad 42.

By displaying the keypad at different positions of the display unit 14 in the case of different PIN entries, the security of the PIN entry is increased. In particular, it is thus prevented that a person spying out the PIN mounts—with intent to defraud—a unit for determining the position of the touch of the pane to thus determine the position of the pane independent of the touch module 16 by himself/herself. As the keypad 42 is each time displayed at another position of the display unit 14, the spying person cannot draw any conclusions on the digit entered by the touch and thus on the PIN even when the person knows the actual coordinates of the touch of the pane.

By way of each of the afore-described security measures, and in particular when combined, a high degree for a secure entry of a PIN via a touchscreen is achieved. Thus, touchscreens already provided at automated teller machines, automatic cash safes, automatic cash systems, payment terminals, statement printers and/or information terminals which up to now were only used for operation and for entry of non-security relevant information can also be used for the entry of the PIN. Thus, the provision of a separate mechanical keypad, in particular an EPP keypad, can be dispensed with so that an easy cost-efficient structure of the device 10 is achieved. Further, in this way, the user-friendliness is increased and the maintenance expenditure is lowered.

What is claimed is:

1. A device for reading magnetic stripe and/or chip cards, in particular bank cards, EC cards and/or credit cards, comprising
   a display unit,
   a touch module arranged in front of the display unit and comprising at least one sensor for determining a position of a touch of a display area,
   and a security module for controlling the display unit and the touch module,
   wherein:
   the security module transmits first data for displaying a keypad by means of the display unit for entering a personal identification number (PIN) to the display unit,
   the touch module generates second data with information about the position of the touch in response to the touch of the display area, and
   in that the touch module encrypts the second data and transmits these encrypted data to the security module.

2. The device according to claim 1, wherein the security module encrypts the first data and transmits the first data to the display unit in an encrypted manner.

3. The device according to claim 1 wherein the touch module determines a first coordinate and/or a second coordinate of the position of the touch of the display area, in that the touch module determines a first transmission value by adding a first offset value to the first coordinate and/or a second transmission value by adding a second offset value to the second coordinate, and in that the second data comprise information about the first transmission value and/or the second transmission value.

4. The device according to claim 3, wherein the security module determines the first offset value and/or the second offset value, in particular by means of a random number generator, and in that, before the display area is touched, the security module transmits third data with information about the first offset value and/or the second offset value to the touch module, preferably in an encrypted manner.

5. The device according to claim 1 wherein the security module encrypts the first data and/or third data by means of a stored encryption algorithm, in particular by means of a Data Encryption Standard (DES) encryption algorithm and/or in that the touch module encrypts the second data by means of a stored encryption algorithm, in particular by means of a Data Encryption Standard (DES) encryption algorithm.

6. The device according to claim 3 wherein the security module decrypts the second data and determines the first coordinate by subtracting the first offset value from the first transmission value and/or the second coordinate by subtracting the second offset value from the second transmission value.

7. The device according to claim 1 wherein the first data comprise information about the position where the keypad is to be displayed on the display unit, in particular a first coordinate and a second coordinate of a center of the keypad.

8. The device according to claim 7, wherein the security module determines the position of the keypad by means of a random process.

9. The device according to claim 7 wherein the security module controls the display unit such that in the case of a first entry of a personal identification number (PIN) the display unit displays the keypad at a first position and in the case of a second entry of a personal identification number (PIN) the security module displays the keypad at a second position different from the first position.

10. The device according to claim 1 wherein the touch module and the security module are connected to each other via a first cable connection, in particular by means of a USB cable, and/or the display unit and the security module are connected to each other via a second cable connection, in particular by means of a USB cable and/or a DVI cable, and in that a first sensor for determining an interruption of the first cable connection and/or a second sensor for determining an interruption of the second cable connection are provided.

11. The device according to claim 1 wherein the touch module and/or the display unit respectively comprise a memory element in which data for an unambiguous identification of the touch module or, respectively, of the display unit are stored, and in that the security module reads out these data at preset time intervals or continuously and determines the presence of the touch module or, respectively, of the display unit dependent on the read-out data.

12. The device according to claim 1 wherein the touch module and/or the display unit are mounted on a housing part of the device in an installation position, in that at least a first anti-removal switch and/or a second anti-removal switch is provided, in that the first anti-removal switch closes an electric circuit that is open in the installation position or opens an electric circuit that is closed in the installation position when the touch module is removed from its installation position, and in that, by way of closing or, respectively, opening of the electric circuit, the security module detects the removal of the touch module from the installation position, in that the second anti-removal switch closes an electric circuit that is open in the installation position or opens an electric circuit that is closed in the installation position when the display unit is removed from the installation position, and in that the security module detects the removal of the display unit from the installation position by way of closing or, respectively, opening the electric circuit.

13. The device according to claim 1 wherein the security module determines whether the device is operated in a secure operating mode or in a non-secure operating mode.

14. The device according to claim 13, wherein the security module controls the display unit such that the display unit displays in which operating state the device is operated.

15. The device according to claim 1 wherein the device comprises a control unit for controlling the security module, and in that the control unit is connected to the security module via at least one data transmission connection.

16. A device for reading magnetic stripe and/or chip cards, including bank cards, EC cards, and/or credit cards, comprising:
a display unit;
a touch module adjacent to the display unit, the touch module including at least one sensor for determining a touch position of a touch of a display area, the touch module configured to generate touch coordinate data including the touch position; and
a security module configured to control both the display unit and the touch module, the security module configured to transmit to the display unit keypad display data for displaying a keypad on the display unit for accepting entry of a personal identification number (PIN) at the display unit, the security module is further configured to encrypt the keypad display data and transmit the encrypted keypad display data to the display unit;
wherein the touch module is configured to encrypt the touch coordinate data including the touch position and transmit the encrypted touch coordinate data to the security module.

17. The device of claim 16, wherein the security module is configured to position the entire keypad at a random location on the display unit.

18. The device of claim 17, wherein an arrangement of numbers on the keypad remains constant at each location of the keypad on the display unit.

19. The device of claim 16, wherein the touch module is configured to determine a first coordinate and a second coordinate of the touch position, determine a first transmission value by adding a first offset value to the first coordinate, and determine a second transmission value by adding a second offset value to the second coordinate, the first transmission value and the second transmission value are included in the touch coordinate data.

20. A device for reading magnetic stripe and/or chip cards, including bank cards, EC cards, and/or credit cards, comprising:
a display unit;
a touch module adjacent to the display unit, the touch module including at least one sensor for determining a touch position of a touch of a display area, the touch module configured to generate touch coordinate data including the touch position; and
a security module configured to control both the display unit and the touch module, the security module configured to transmit to the display unit keypad display data for displaying a keypad on the display unit for accepting entry of a personal identification number (PIN) at the display unit, the security module is further configured to position the entire keypad at a random location on the display unit, and an arrangement of numbers on the keypad remains constant at each location of the keypad on the display unit;

a control unit that controls the security module; and a reading unit that reads a magnetic stripe and/or chip card, the reading unit is controlled by the control unit;

wherein the touch module is configured to encrypt the touch coordinate data including the touch position and transmit the encrypted touch coordinate data to the security module; and wherein the touch module is further configured to determine a first coordinate and a second coordinate of the touch position, determine a first transmission value by adding a first offset value to the first coordinate, and determine a second transmission value by adding a second offset value to the second coordinate, the first transmission value and the second transmission value are included in the touch coordinate data.

* * * * *